United States Patent Office 2,784,589
Patented Mar. 12, 1957

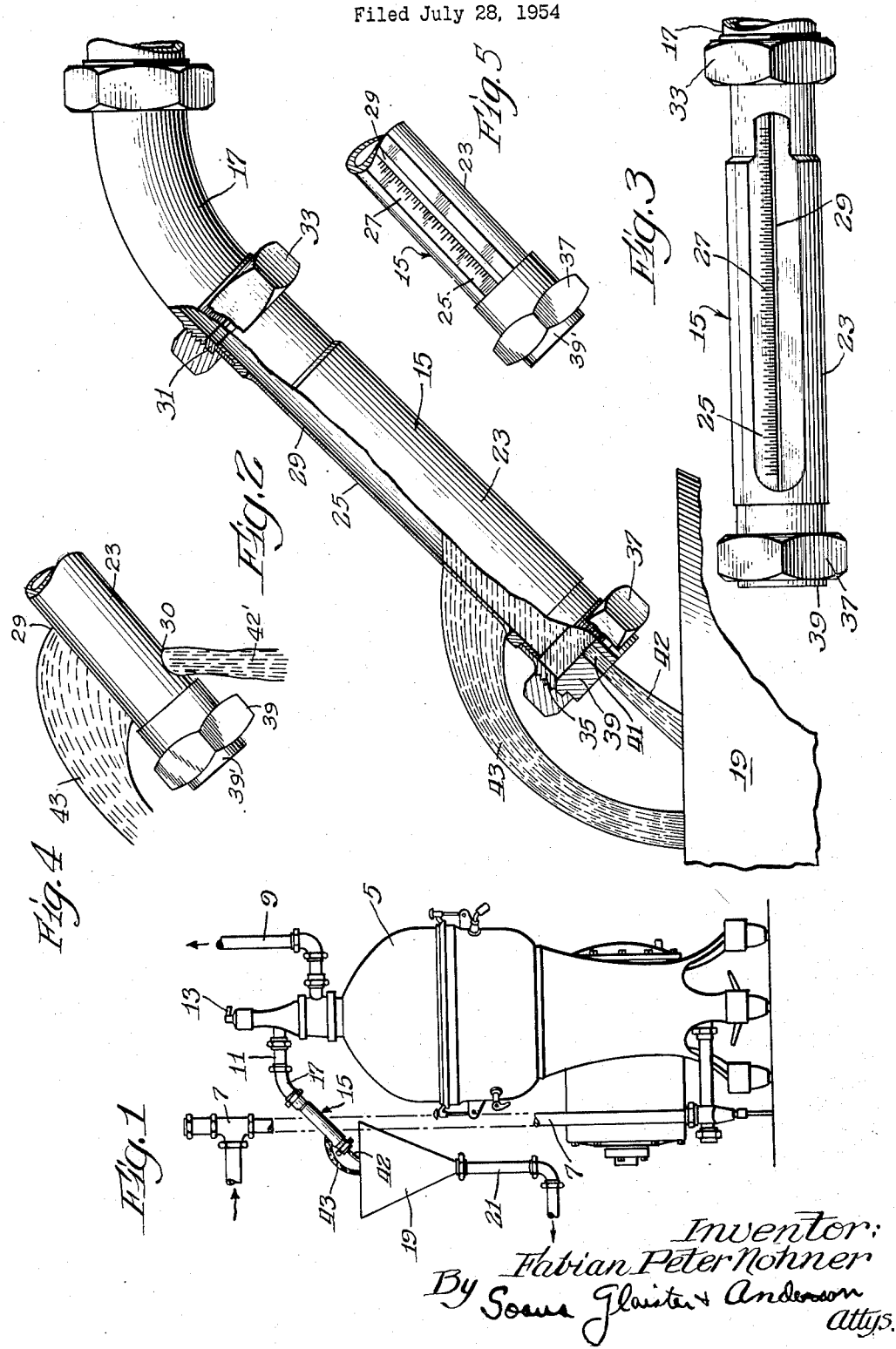

2,784,589

COMBINED CREAM SEPARATOR AND FLOW METER

Fabian Peter Nohner, Hutchinson, Minn., assignor to Kraft Foods Company, Chicago, Ill., a corporation of Delaware Application July 28, 1954, Serial No. 446,328

5 Claims. (Cl. 73—198)

The present invention relates to apparatus for measuring the flow of fluids and has particular application to a flow gauge which is adapted for use in measuring the flow of liquids through pipes wherein the liquid is in free flow through the pipe, i. e., where the liquid is open to atmospheric pressure in said pipe. The flow gauge and measuring method of the present invention have particular application in connection with closed centrifugal separators of the type employed in the dairy field whereby the amount of milk fat removed from milk in a standardizing operation may be continuously determined to provide a standardized milk of uniform composition.

In a milk standardizing system of the type referred to above, the commercial separators remove cream of a substantially constant fat content from the milk which passes through the separator to effect standardization. The operator of the system periodically checks the volume of cream passing outwardly from the cream outlet to determine the amount of fat which is being removed in the standardizing process. Generally, the volume of cream is determined in the following manner. The operator is provided with a cup which holds either one or two pounds of cream and with a stop watch he determines the length of time which is required to fill his standard cup. After the time is determined, he consults a chart to find out how much fat is being removed in the cream. For example, in one standard separator, if a one pound capacity cup is filled in 5.1 seconds, 1.5 percent milk fat is being removed from the milk being passed through the separator; if the time required to fill the cup is 5.5 seconds, 1.4 percent fat is removed, etc. Thus, it will be seen that it becomes necessary to determine with great exactitude the time period in which the cup is filled and an error of a small fraction of a second may result in a fairly large error in the composition of the resultant standardized milk. Furthermore, there is no visual indication of flow changes so that the operator must continuously check the out-flow from the separator to effect standardization. With the present method it is only possible to standardize milk to within approximately .2 percent of fat. Thus, under factory conditions if the operator attempts to standardize for example a 4.6 percent milk to a 3.5 percent standardized milk he may obtain a standardized milk of from 3.3 to 3.7 percent. This extreme inaccuracy of the prior art methods has resulted in uneconomical operation in most dairy plants.

The use of various gauges to solve this problem has been attempted but all of them have serious deficiencies. First, the gauge must be of sanitary construction, that is to say, that it must be susceptible to being vigorously cleaned several times a day and this requires rugged simple construction. Also, most gauges cause a back pressure in the line which cause difficulties in the separator operation. Consequently, in the dairy field the old fashioned cup method is still the general method used.

The object of the present invention is the provision of an accurate flow gauge which can be readily calibrated and which is inexpensive and of sanitary construction. Other objects and advantages of the invention will become known by reference to the drawings and to the following description of one preferred embodiment thereof.

In the drawings:

Figure 1 is an elevational view of a cream separator on which is installed a gauge fabricated in accordance with the principles of my invention;

Figure 2 is an enlarged fragmentary view of the gauge which is attached to the separator in Fig. 1;

Figure 3 is an elevational view of one side of the gauge illustrated in Figs. 1 and 2;

Figure 4 is a fragmentary view of a modified form of the gauge; and

Figure 5 is a fragmentary view of another modified form of the gauge.

The embodiment of the gauge illustrated in the drawings is shown installed on a standard cream separator 5 of well-known construction, i. e., an "Air Tight" standardizing clarifier sold by The De Laval Separator Company. As shown in the drawings, unstandardized milk is conducted to the separator 5 by a pipe system 7. After the milk passes through the separator 5, the standardized milk passes outwardly through the pipe 9 and the separated cream passes outwardly through the pipe 11. Adjustment of the proportion of cream passing outwardly from the separator is controlled by adjustment of the cream screw (not shown) which is controlled by the valve handle 13 illustrated.

A flow gauge 15 embodying various of the features of the invention, is attached to the cream outlet 11 of the separator 5 by means of a 45° elbow 17 (Fig. 1). As shown in the drawings, the cream after it is passed through the gauge 15, is discharged into a funnel 19 which directs the cream into an outlet cream line 21 through which it is pumped to a suitable container (not shown). In view of the fact that this equipment is used on milk it is all made of sanitary construction and is preferably fabricated from stainless steel with a minimum of corners and crevices.

The flow gauge 15 comprises a length of stainless steel tube 23 which is provided on one of its sides with a flattened area 25, as illustrated in Figs. 2 and 3. This flattened area 25 is provided so as to facilitate the provision of a scale 27 which can be read by an operator. Down the central portion of the flattened area 25 there is provided a longitudinally extending slit or slot 29. In one embodiment of the gauge which has been successfully used, the tube 23 is fabricated from a piece of 1½ inch stainless steel tubing, and the slit 29 is .030 inch in width. The slit 29 passes completely through the wall of the tube 23 as illustrated (Figs. 2 and 3).

One end of the tube 23 is provided with a shoulder 31 with which is associated a union nut 33 by means of which the tube 23 may be attached to the conduit which carries the liquid to be measured (in the illustrated embodiment the elbow 17). The other end of the tube 23 is provided with a threaded section 35 which is adapted to receive a union nut 37. This union nut, as illustrated in Fig. 2, holds a flanged disk 39 across the end of the tube 23 to close its lower end. The disk 39 is provided with an aperture 41 which is adapted to permit some of the fluid passing through the tube 23 to escape from the tube.

In operation, the gauge is connected, as has been before pointed out, by means of the 45° elbow 17 or by any other suitable connection which will dispose the tube 23 at an angle to the horizontal, to the outlet of the separator so that the cream to be measured passes through the tube of the gauge. As illustrated in Fig. 2, the slit 29 is disposed on the top side of the tube 23. Initially, before the level of the liquid in the tube 23 rises to a point where it will flow out the lower end of the slit 29, the fluid flows outwardly from the aperture 41 in the disk 39 into the collecting funnel 19 (see the stream 42, Figs. 1 and 2). As the flow gradually fills up, the tube it runs outwardly through the slit 29 into the funnel 19 in a stream, as illustrated at 43 in the drawings, Figs. 1 and 2, as well as through the aperture 41.

The flow soon reaches equilibrium and the height of the stream 43 along the scale 27 may be determined and from this the volume of cream flowing out is immediately apparent from a calibration chart which may be prepared for the conditions of operations obtained in the system with which the gauge is employed or by marking the scale 27 so that it directly reads in volume or in percentage of fat removed.

The gauge, as described, is extremely accurate and with it the percentage of milk fat in the standardized milk may be maintained within about .02 percent of the desired amount, e. g., if one desires a milk containing 3.5 percent fat it can be controlled between 3.48 and 3.52 under factory conditions.

In the event that the flow is so high that it extends above the scale 27, a disk may be substituted for the disk 39 which has a larger aperture thereby lowering the height of the stream 43 on the scale 27 to a point at which it can be readily read. However, I have found that with a gauge that has been described, i. e., one fabricated from a 1½ inch stainless steel tube having a slit, .030 inch in width and which is supplied with a disk 39 having an aperture ¼ inch in diameter, volumes up to about 800 pounds per hour may be readily handled.

In place of the apertured disk 39, a hole or aperture 30 may be provided in the wall of the tube 23 for the outflow of stream 42' (Figure 4); or the slit 29 may be widened to permit greater out-flow with permanent closing the end of the tube 23 with a non-perforated disk 39'. This, however, tends to reduce the flexibility of the unit and tends to make it less sanitary and not quite so satisfactory. Also, the angle of the tube is not of prime importance but the 45° angle illustrated provides an angle which adapts itself to the efficient flow of the stream 43.

Various features of the invention are set forth in the appended claims.

I claim:

1. A cream separator having an inlet for unstandardized milk, an outlet for standardized milk, an outlet for cream which includes an elongated conduit of closed construction, said conduit being disposed at an angle to the horizontal, means defining a slit along the upper side of said conduit whereby at least a portion of said cream flows outwardly through said slit, and said conduit having a scale along said slit whereby the position of the cream flow from said slit may be measured.

2. A cream separator having an inlet for unstandardized milk, an outlet for standardized milk, an outlet for cream which includes an elongated conduit of closed construction, said conduit being disposed at an angle to the horizontal downwardly from said cream outlet, means defining a slit along the upper side of said conduit whereby at least a portion of the cream flows outwardly through said slit, means defining an aperture adjacent the lower end of said conduit, and said conduit having a scale along said slit whereby the position of the cream flow from said slit may be measured.

3. A cream separator having an inlet for unstandardized milk, an outlet for standardized milk, an outlet for cream which includes an elongated conduit of closed construction which is disposed at an angle to the horizontal downwardly from said cream outlet, means for at least partially closing the lowermost end of said conduit so as to provide a pool of cream in the lower end of said conduit when said separator is in operation, means defining a slit along the upper side of said conduit which is adapted to extend upwardly along the upper side of said conduit from a point adjacent the lower end of said conduit, and said conduit having a scale along said slit whereby the position of the cream flow from said slit may be measured.

4. A cream separator having an inlet for unstandardized milk, an outlet for standardized milk, an outlet for cream which includes an elongated tube of closed construction which is disposed at an angle to the horizontal downwardly from said cream outlet, means for at least partially closing the lowermost end of said tube which comprises a member having a hole therein of such size that it impedes the flow of cream out of the lower end of said tube so as to provide a pool of cream in the lower end of said tube when said separator is in operation, means defining a slit along the upper side of said tube which is adapted to extend upwardly along the upper side of said tube from a point adjacent the lower end of said tube, and said conduit having a scale along said slit whereby the position of the cream flow from said slit may be measured.

5. A cream separator having an inlet for unstandardized milk, an outlet for standardized milk, an outlet for cream which includes an elongated tube which is disposed at an angle of about 45° to the horizontal downwardly from said cream outlet, means defining a slit along the upper side of said tube which is adapted to extend upwardly along the upper side of said tube from a point adjacent the lower end of said tube, means for at least partially closing the lowermost end of said tube which comprises a member having a hole therein of such size that it impedes the flow of fluid out of the lower end of said tube so as to provide a pool of fluid in the lower end of said tube when said separator is in operation, the level of said pool being in the area of said tube occupied by said slit and said conduit having a scale along said slit whereby the position of the surface of said pool may be measured.

References Cited in the file of this patent

UNITED STATES PATENTS

| | | |
|---|---|---|
| 1,042,097 | Englebright | Oct. 22, 1912 |
| 1,983,231 | Keitel | Dec. 4, 1934 |
| 2,165,705 | Houser | July 11, 1939 |

FOREIGN PATENTS

| | | |
|---|---|---|
| 402,685 | Great Britain | Dec. 7, 1933 |